United States Patent [19]
Burgett et al.

[11] 3,948,095
[45] Apr. 6, 1976

[54] FORCE VARIATION TESTING OF TIRES

[75] Inventors: Donald K. Burgett, Tallmadge; James E. Rice, Cuyahoga Falls; John W. Touchette, Hartville, all of Ohio

[73] Assignee: The Goodyear Tire & Rubber Company, Akron, Ohio

[22] Filed: Apr. 30, 1975

[21] Appl. No.: 573,295

[52] U.S. Cl. ................................................ 73/146
[51] Int. Cl.² ........................................ G01M 17/02
[58] Field of Search .................. 73/146, 8, 117, 480

[56] References Cited
UNITED STATES PATENTS

| | | | |
|---|---|---|---|
| 3,543,576 | 12/1970 | Bishop | 73/146 |
| 3,552,200 | 1/1971 | Hermanns et al. | 73/146 |

*Primary Examiner*—Donald O. Woodiel
*Attorney, Agent, or Firm*—F. W. Brunner; R. S. Washburn

[57] ABSTRACT

A rigid structure supporting a motor driven spindle carried in a radially and axially stiff hydrostatic fluid film bearing provides for mounting and rotating a tire at a selected speed including a speed of the tire corresponding to a road speed in excess of 100 miles per hour (approximately 160 kilometers per hour) while the tire is loaded against the cylindrical surface of the freely rotatable load wheel. Force and force variation measurements can be taken by means of measurement frames or load cells including a plurality of strain gauges fixed therein of force and force variation components oriented radially tangentially and axially of the tire which forces are communicated to the spindle and from the spindle entirely through the fluid film of the fluid film bearing to the measuring frames, while the spindle and tire are driven in loaded rolling contact with the load wheel.

10 Claims, 4 Drawing Figures

FORCE VARIATION TESTING OF TIRES

The foregoing abstract is not to be taken as limiting the invention of this application, and in order to understand the full nature and extent of the technical disclosure of this application, reference must be made to the accompanying drawing and the following detailed description.

This invention relates to testing vehicle tires and particularly to testing the characteristics of vehicle tires commonly referred to as force variations.

To acquaint persons skilled in the related arts with the principles of the invention, a preferred embodiment illustrating the best mode presently contemplated for the practice thereof will be described by and referring to the attached drawings, wherein.

Figure 1:
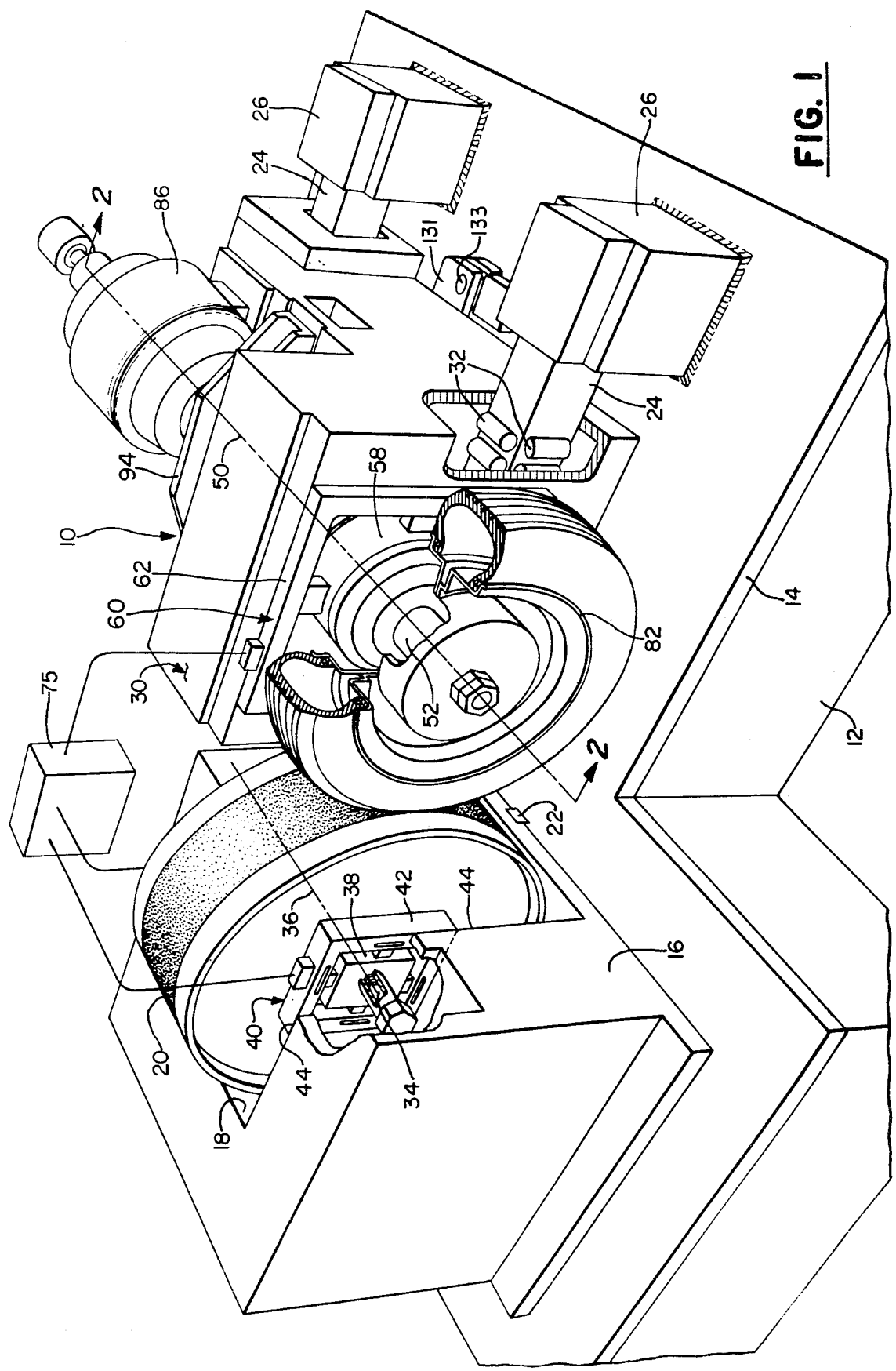
FIG. 1 is a perspective view of an apparatus in accordance with the invention.

The tire testing machine 10 illustrated in FIG. 1 is, in accordance with one aspect of the invention, capable of subjecting a tire to tests for force variation at any speed likely to be encountered in the use of the tire.

The apparatus in accordance with the invention includes a non-resonant foundation or base 12 on which the machine 10 is rigidly mounted. The base is preferably a massive unit of reinforced concrete suitably isolated from vibration originating in or transmitted by the earth, the surrounding buildings, or adjacent apparatus.

The term "non-resonant" as used in the present specification and the claims thereof will be understood to mean as not subject to vibration at any natural frequencies less than about 200 cycles per second and preferably not less than 300 cycles per second.

The foundation 12 includes a base plate 14 of steel or equal, incorporated integrally therewith. A rigid non-resonant pedestal 16 having a recess 18 therein accommodating a load wheel 20 presently to be described, is affixed to the base plate 14 rigidly and integrally therewith by a conventional array of bolts, non shown, and by a key 22 fitted in a corresponding longitudinal slot in the base plate and in the bottom surface of the pedestal which provides appropriate alignment.

Two very stiff beams 24 of rectangular cross-section extend parallel to each other and spaced above the base plate. Each of the beams is supported in rigid beam supports 26, at its respective longitudinal ends, and centrally of its length, the beam supports being welded or otherwise made integral with the base plate such that the respective beams and their supports become an integral and non-resonant part of the foundation structure.

A non-resonant, rigid spindle support frame 30 is mounted on the beams for movement longitudinally thereof but completely restrained from movement in directions other than longitudinally of the beams.

To insure positive and true linear movement of the carriage, a plurality of pairs of linear rolling element bearings 32 are fixed in suitable recesses in the support frame in opposed pairs to engage the respective pairs of surfaces of the beams 24. The respective pairs of bearings 32 are each preloaded to effect a zero clearance condition and non-resonant relation of and between the beams 24 and the support frame 30, independent of external load applied on the carriage. In the machine 10 being described, the linear rolling element bearings 24 are obtained from the Scully-Jones Corporation, Chicago, Illinois, under the name Tychoway Recirculating Bearings.

The balanced, non-resonant load wheel 20 is mounted on a correspondingly stiff, non-rotatable shaft 34 defining a first axis 36 extending transversely of the recess 18 in the load wheel pedestal 16. The respective ends of the shaft 34 are fixed centrally each in the inner member 38 of a force measuring frame 40, the outer member 42 of which is rigidly attached on the respective pedestal wall 44 forming the recess. The recess 18, its walls 44 and the frame 40 are respectively located equidistantly from the central rotation plane of the load wheel 20.

A second axis 50 of the machine, about which the tire to be tested is rotated, is defined by a spindle 52 extending parallel to the axis 36, and perpendicularly with respect to the respective beams 24, through a central opening 54 of the support frame 30.

Figure 2:
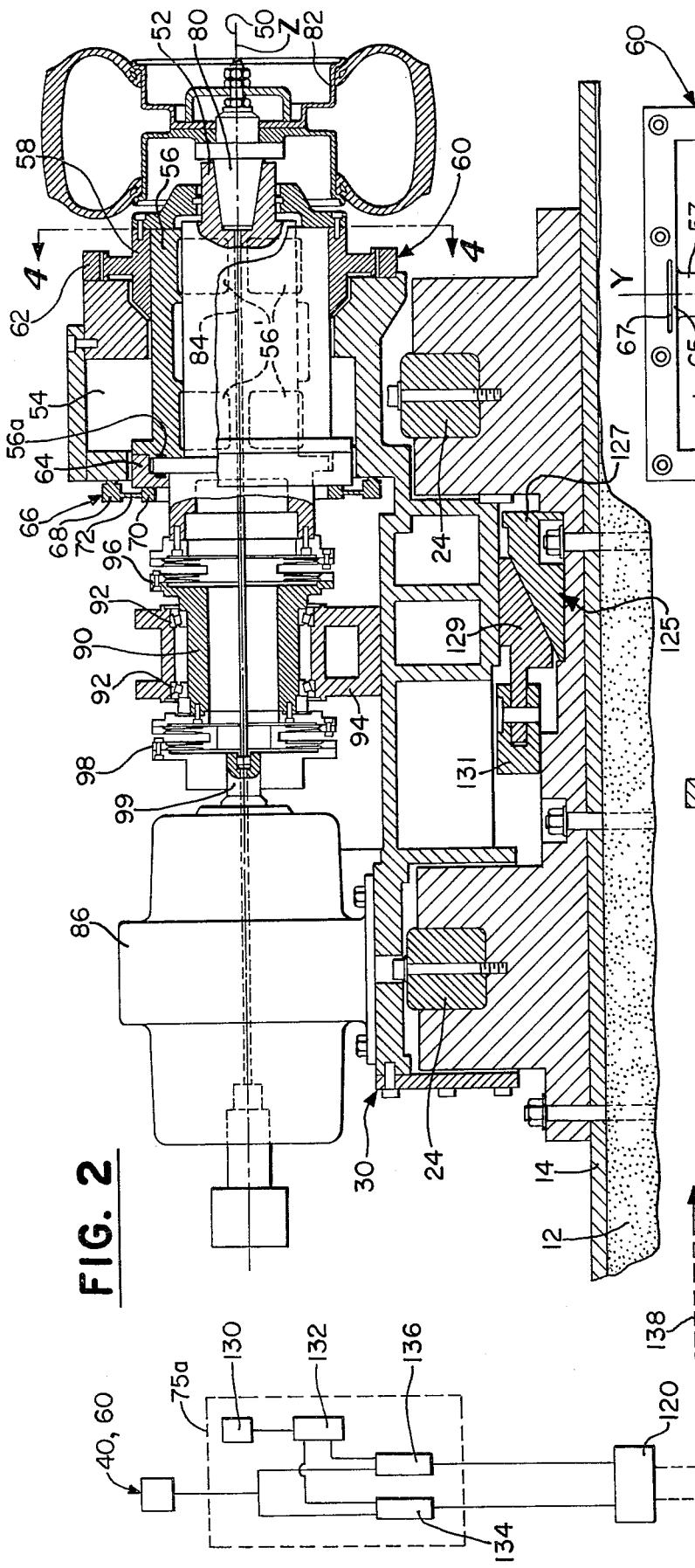
FIG. 2 is an axial cross-section elevation of the apparatus of FIG. 1 as indicated by the line 2—2 therein, also showing schematically features of a control circuit thereof.

As illustrated in FIG. 2, the spindle 52, in accordance with the invention, is carried rotatably in a hydrostatic fluid film bearing housing 56 disposed within the support frame 30. The housing is rigidly secured within the inner member 58 of a force measuring frame 60, the outer member 62 of which is rigidly secured to the support frame 30.

The forward end of the spindle is provided with an adapter 80 of conventional design which accommodates a suitable tire mounting rim 82 on which the tire to be tested can be mounted, and inflated, for coaxial rotation with the spindle. Optionally, a coaxial passage 84 through the spindle can be provided to supply inflation air to the tire being tested. Such an arrangement is known and requires no further description to persons skilled in the related arts. A tire to be tested is carried by the adapter on the spindle for coplanar rolling engagement with the load wheel 20.

To rotate the spindle, a motor 86 is mounted on the support frame 30 in coaxial alignment with the spindle 52. The motor 86 is preferably a D.C. motor energized by way of a suitable speed control unit from a motor generator set (not illustrated).

An intermediate shaft 90 precisely aligned coaxially both with the motor and with the spindle is mounted rotatably in suitable bearings 92 fixed in a pedestal 94 which is a part of the support frame. The intermediate shaft is connected corotatably to the spindle by a flexible coupling 96 which is torsionally rigid but pliant axially to prevent the transmission of axial forces or bending moments between the spindle and the intermediate shaft. A similar flexible coupling 98 corotatably connects the motor shaft 99 and the intermediate shaft 90 in the same manner for the same purpose. The transmission of driving effort from the motor 86 to the tire to be tested is pure torque, free of forcing variations.

The fluid film hydrostatic bearing, preferred in the practice of the invention, supports the spindle concentrically of the axis 50, rigidly, and free of any metal-to-metal contact or variations in supporting forces between the bearing housing 56 and the spindle 52. The bearing housing 56 also provides a fluid film thrust support 56a sustaining the spindle rigidly against axial displacement also free of metallic contact between the bearing and the spindle. A bearing arrangement particularly suited to the practice of the instant invention is supplied by the Saginaw Steering Gear Division of General Motors Corporation, Saginaw, Michigan, under their designation Hydrocentric Spindle Assembly, the particular dimensions thereof being modified only as to size to suit the machine described herein.

The Hydrocentric Spindle Assembly comprises two circumferentially arranged rows of oil pressure pads 56' in each of which lubricating oil under pressure forms an almost perfectly rigid column of large cross-section and very small (radial) height independently supporting its quarter-circumference of the spindle. Oil pressure in each pad can be several hundred pounds per square inch. The attained radial bearing stiffness is in excess of 15 million pounds per inch (about $2.7 \times 10^5$ kg/cm).

Upon consideration of the arrangement described, it will be noted that particular advantages are attained by the invention. Force variations exerted by the tire, as it rotates in loaded rolling contact with the load wheel 20, are communicated between the rotating spindle 52 and the spindle bearing 56 without metal contact and only through essentially rigid films of oil. The load measuring frame 60, the inner member 58 of which is rigidly secured to the bearing housing 56, therefore, receives the force variations as the same are generated by the tire, free of distortion, mechanical noise, and other spurious signals. The need for electrically or electronically modifying or filtering the force variation signals is reduced or eliminated.

Figure 3:
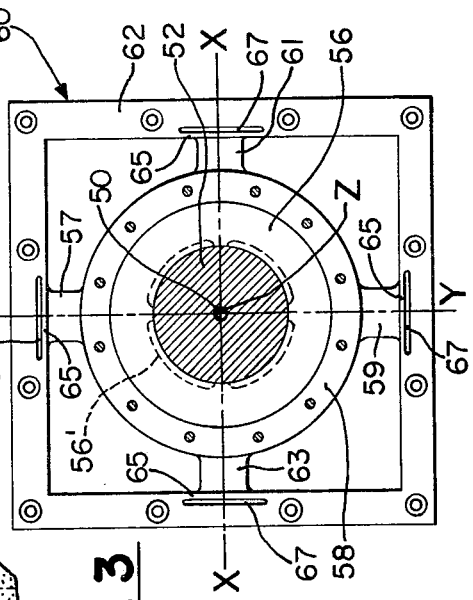
FIG. 3 is a descriptive view of force measuring means employed in the apparatus of FIG. 1.

The force measuring frame 60 previously mentioned is illustrated in FIG. 3 and comprises the rigid outer member 62 adapted for rigid securement to the carriage 30, the rigid inner member 58 configured for rigid attachment to the housing 56 of the fluid film bearing, and four deflectable arms 57, 59, 61, 63, fixed respectively to and between the inner and outer members at positions spaced at 90° about the axis 50. Each arm is disposed symmetrically with respect to one of two mutually perpendicular reference axes, $x$ and $y$. The rotation axis 50 of the spindle coincides with the third reference axis $z$.

Each of the arms is connected to the outer member 62 by a plate 65 formed integrally with the member 62 by a narrow slot 67 parallel to the plate through the member. The length and width of the slot 67 exceeds the length and width of the cross-section of the arm. The connection between each arm and outer member thus is made extremely stiff in directions perpendicular to the respective reference axis, but pliant parallel to such axis. Strain gauges of known type, and in particular BLH gauge type SPB3-20-35 having a gain factor in excess of 120 are mounted on each of the four arms and are electrically connected, in the manner well understood in the art, to a conventional indicating and/or recording instrument 75.

The pair of force measuring frames in which the non-rotating shaft 34 is carried are, except for dimensions, identical to the frame described. Such strain gauge frames are themselves well known to persons skilled in the related arts. Force variation measurements taken by way of the pair of frames 40 are independent of those taken by way of the frame 60.

It is a desirable practical advantage of the invention that reactions of the forces of interest which are exerted by the tire on the load wheel can be measured directly from the rotating, and driving, spindle on which the tire is mounted, while the tire is being driven in loaded rotation.

Insofar as we are aware, measurement of force variations in tires has not been done by sensors associated with tire mounting spindle when it is the driving member. According to the present invention, force measurements are taken directly from the rotating tire mounting spindle while the tire being tested is being driven thereby. In effect, the force variations of the tire are "looked at as the vehicle sees them" on a driving wheel.

Figure 4:
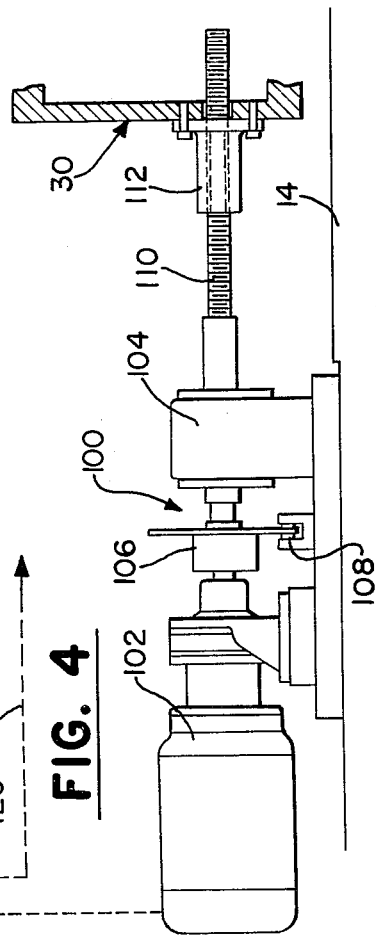
FIG. 4 is an elevation view of carriage traversing means forming a part of the apparatus of FIG. 1.

To move the support frame 30 and a tire thereon toward or away from the load wheel 20, a traverse mechanism 100, illustrated in FIG. 4, comprises a motor 102 and gear reducer 104, and a disc-brake assembly 106 including a brake 108 mounted on the base plate 14. A traversing screw 110 coupled to the reducer shaft engages a nut 112 non-rotatably mounted on the carriage 30. On being energized, the motor causes the screw to rotate in the appropriate sense to move the carriage along the beams 24 toward or away from the load wheel 20. The motor when energized to apply a deflecting load to the tire is, by the control element 120, made responsive to attainment of a particular predetermined load on the tire so that the motor is then deenergized and the brake applied to maintain such load.

In accordance with a further feature of the invention, load control means for controlling the test load applied between the tire and the load wheel are provided. The load applied to the tire at the load wheel tends to vary with the speed of the tire. Control of such applied load is provided by a load control circuit 75a which is added to the known circuitry of the force variations indicating/recording unit 75. The circuit 75a includes a potentiometer or the like 130, in which a desired test load is preset, which is connected to a mini-computer 132 capable of computing a plus and a minus tolerance with respect to the desired load preset in the potentiometer 130. A pair of comparators 134, 136 are connected to receive load and tolerance signals from the computer 132 and are also connected to receive signals representative of the load from the force measuring frames 40 and/or 60. The respective comparators 134, 136 are connected to convey their respective control signals to the traverse motor control element 120. Actuation of the motor starter of the control element causes the motor 102 to move the carriage 30 sufficiently to adjust the actual load toward the present load, independently of the speed of the tire. An output connection 138 from the element 120 conveys signals to actuate the locking means presently to be described.

The strain gauges in the force measuring frames 40 and 60 are, of course, capable of measuring the amount of the initial or base load applied between the tire and the load wheel. Because the base load, at zero speed and a given radial deflection of the tire, tends to increase with increase in tire speed, advantage is taken of the base load measuring capability.

Referring again to FIG. 2, locking means 125 can be provided in the combination of a wedge 127 fixed on the base plate 14 and a cooperating wedge 129 carried slidably on the carriage 30 to engage or disengage the wedge 127. The wedge 129 is moved by a lever 131 pivotable about a pin 133 (FIG. 1) fixed on the base plate and moved in the appropriate sense by a hydraulic cylinder (not shown) to move the wedge 129 into or out of locking engagement with the wedge 127.

While certain representative embodiments and details have been shown for the purpose of illustrating the invention, it will be apparent to those skilled in the art that various changes and modifications may be made therein without departing from the spirit or scope of the invention.

What is claimed is:

1. A tire testing machine comprising:
   a load wheel rotatable about a first axis;
   a rigid spindle rotatable about a second axis parallel to the first axis and having means for mounting a tire coaxially and corotatably therewith;
   a bearing housing including a hydrostatic fluid film bearing supporting said spindle free of metal-to-metal contact with the housing;
   a rigid, non-resonant support frame having a central opening therethrough in the direction of the second axis and accommodating said bearing housing therein;
   spindle drive means for rotating the spindle and the tire thereon, the drive means being mounted integrally with the support frame;
   and force measuring means having a first member fixed rigidly to the support frame, a second member fixed rigidly to the bearing housing, and a plurality of load-responsive members extending integrally between the first and the second member;
   whereby the reactions of forces between the load wheel and the tire are communicated to the force measuring means only through the fluid film of the fluid film hydrostatic bearing.

2. A tire testing machine as claimed in claim 1, including means for effecting relative movement between the load wheel and the spindle perpendicularly to both the first and the second axis to engage the tire and the load wheel in loaded rotating contact.

3. Apparatus as claimed in claim 1, the fluid film of said film bearing providing resistance to deflection of the spindle normal to its rotational axis of at least $15 \times 10^6$ lbs/in.

4. A tire testing machine as claimed in claim 1, further comprising a massive non-resonant base, including a parallel pair of beams integrally attached to said base and extending transversely of the second axis and supporting said support frame for linear movement therealong, wherein the relation of the spindle to the base is such that the spindle, the support frame, and the base are non-resonant at any frequency below about 300 cycles per second.

5. The tire testing machine as claimed in claim 4, further comprising a plurality of pairs of linear rolling element bearings disposed respectively between opposite surfaces of the rectangular beam and corresponding faces of the support frame, each pair of the linear bearings being preloaded to effect a non-resonant zero clearance condition and relation of said support frame to said base.

6. A tire testing machine as claimed in claim 5, additionally comprising carriage locking means for fixing the position of the spindle axis relative to the first said axis independently of any means for effecting movement of the carriage.

7. A tire testing machine as claimed in claim 6, including traversing means for effecting movement of said carriage and said spindle toward and away from the first said axis.

8. A tire testing machine as claimed in claim 7, said traversing means comprising a threaded nut affixed on said carriage, a screw cooperatively threaded in the nut, remotely energizable driving means to rotate the screw relatively of the nut whereby a predetermined test load to be exerted by a tire on said load wheel can be applied independently of the rotational speed of said tire.

9. A tire testing machine as claimed in claim 8, further comprising load control means connected to said means for converting forces and to said traversing means and operative to actuate said traversing means to control the test load applied between a tire and said load wheel independently of the rotational speed of the tire.

10. A tire testing machine as claimed in claim 1, further comprising a massive non-resonant base including a rigid non-resonant pedestal having a recess therein accommodating said load wheel;
   a non-rotating shaft defining the first said axis and disposed transversely of said recess coaxially of the load wheel;
   a pair of force measuring frames each disposed normal to said axis and axially outwardly of said wheel each frame including a rigid outer member fixed on said pedestal and a rigid inner member fixed rigidly on said shaft and having force measuring means affixed on the frame between said outer and inner member for converting forces applied to said frame to electrical signals representative of the orthogonal components of said forces;
   whereby components of forces acting on the tire and on the load wheel can be measured simultaneously and independently.

* * * * *